United States Patent Office 3,525,587
Patented Aug. 25, 1970

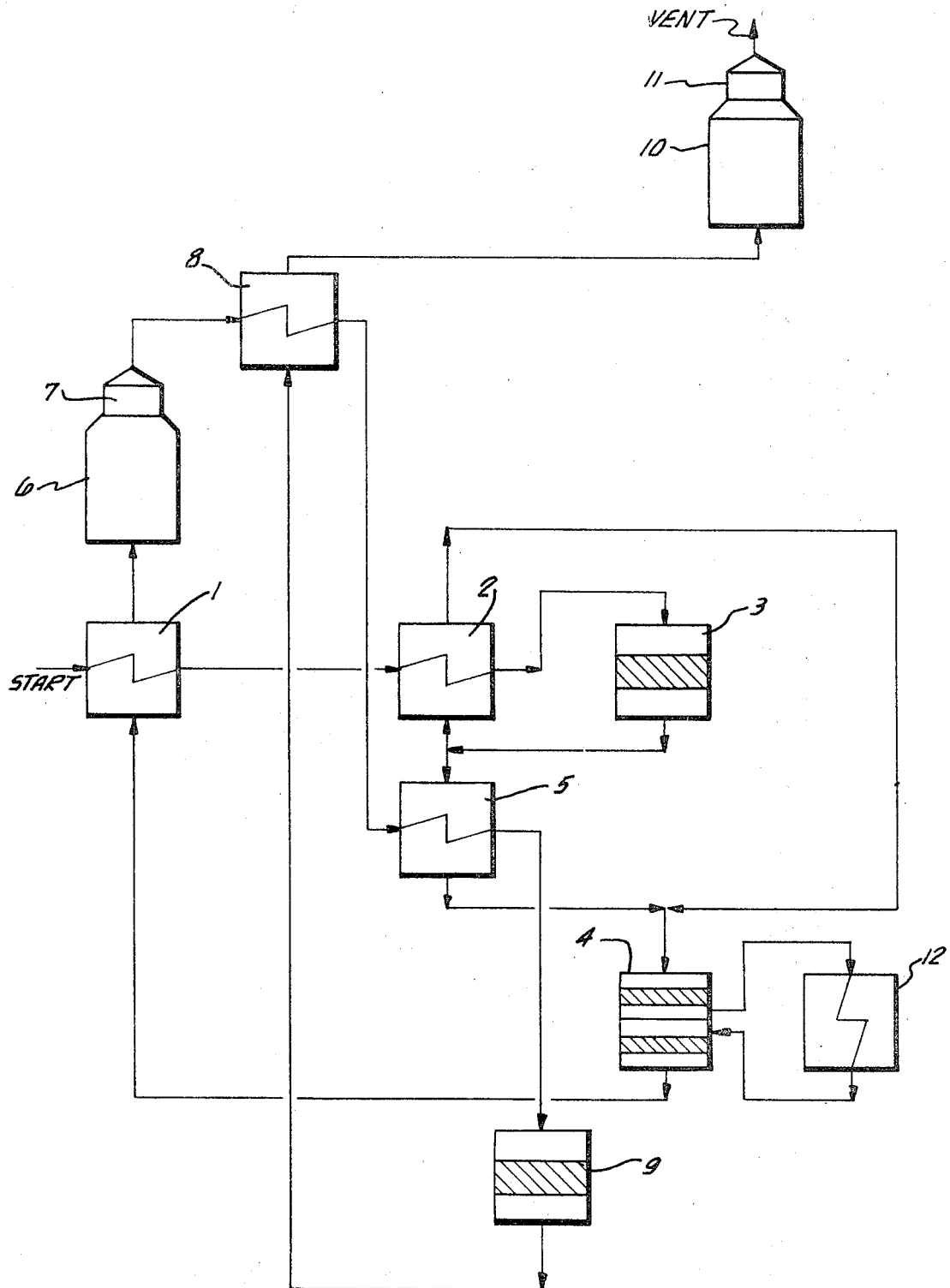

3,525,587
METHOD OF SULFURIC ACID MANUFACTURE
Timothy J. Browder, Jr., Los Alamitos, Calif., assignor to The Ralph M. Parsons Company, Los Angeles, Calif., a corporation of Nevada
Filed July 19, 1968, Ser. No. 746,103
Int. Cl. C01b *17/76*
U.S. Cl. 23—168                                    12 Claims

ABSTRACT OF THE DISCLOSURE

Multiple stage process for the production of sulfuric acid by the catalytic oxidation of sulfur dioxide-containing gas and the multiple stage absorption of sulfur trioxide produced by such catalytic oxidation. A portion of the exit gas from the first of three successive oxidation stages is utilized to pre-heat gas fed into the third oxidation stage, an intermediate absorption stage being provided between the second and third oxidation stages. The temperature of the exit gas from the second oxidation stage can thereby be lower than the temperature of gas fed into the third oxidation stage so as to allow maximum conversion efficiency.

BACKGROUND OF THE INVENTION

This invention relates to a process for the production of sulfur trioxide and more particularly relates to an improved multi-stage oxidation and absorption process wherein gas fed from an intermediate absorption stage into a successive oxidation stage is more efficiently pre-heated to its required initiation temperature.

Sulfur dioxide-containing gas is currently produced in a wide variety of industrial processes. Considerable concern has arisen over the problem of lowering the content of sulfur oxides in waste gas in view of the obvious pollution problems. At present, sulfur dioxide-containing gas is treated both to lower the content of sulfur oxides in stack gas and to provide usable products, such as sulfuric acid, oleum, and liquid sulfur trioxide.

Sulfuric acid and other important products originate by reacting sulfur dioxide-containing gas with excess air while passing the gas at a suitable temperature over oxidation catalysts. At a predetermined minimum temperature, referred to as the initiation temperature, the following reaction takes place:

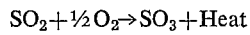

$$SO_2 + \tfrac{1}{2} O_2 \rightarrow SO_3 + \text{Heat}$$

As is widely known, a final higher conversion can be obtained if the sulfur dioxide-containing gas is freed of sulfur trioxide during the above oxidation reaction. Thus, a series of oxidation stages are utilized with intermediate and final absorption stages in order to accomplish this result. Sulfur trioxide is removed from the gas in the absorption stages, such as by washing with sulfuric acid, before the gas is passed to a successive oxidation stage. On principle, this technique should yield exceptionally high conversion. In practice, however, difficulties have arisen in obtaining the desired initiation temperature from one oxidation stage to the next without the use of large amounts of heat transfer area.

A conventional multiple-stage oxidation and absorption process, as disclosed in U.S. Pat. 3,259,459, utilizes heat exchange from the exit gas of the penultimate oxidation stage to pre-heat gas entering the final oxidation stage, with an intermediate absorption stage being provided between the last two oxidation stages. The process of the patent, however, in order to transfer heat, requires that the temperature of gas exiting from the penultimate oxidation stage be higher than the temperature of gas entering the final oxidation stage, a requirement which prevents the most efficient operation of the process. That is, high temperatures reduce the effective conversion efficiency, such that maximum or optimum conversion cannot be achieved. In the patented technique, the heat exchanger surface employed between the final two oxidation stages becomes extremely large when the temperature of the gas leaving the penultimate oxidation stage approaches the temperature of the gas entering the final oxidation stage. In the case of the penultimate stage, the exit temperature being equal to the inlet third stage temperature, the surface area of the heat exchanger would have to be infinite.

Conventional multiple oxidation stage process utilizing intermediate absorption between stages for production of sulfuric acid are therefore deficient in that they fail to allow the desired flexibility of initiation of optimum inlet or exit temperatures for each of the oxidation stages. As a result, less than the highest conversion efficiency is obtainable. Elaborate and costly apparatus for correcting this problem, in the form of large heat temperature apparatus, generally has been less than satisfactory.

STATEMENT OF THE INVENTION

This invention utilizes a portion of the exothermic reaction heat of gas exiting from the first of at least three successive oxidation stages, having an intermediate absorption stage between the second and third stages thereof, for pre-heating gas passing from such intermediate absorption stage into the third oxidation stage. The temperature of gas introduced into the third oxidation stage can thereby be maintained at any desired temperature and is completely independent of the temperature of gas exiting from the preceding oxidation stage.

The exit gas from the first oxidation stage is preferably split into two streams, one stream being fed to a heat exchanger for pre-heating gas to be fed into the first oxidation stage, and the other stream being utilized to pre-heat gas passing from the intermediate absorption stage to the third oxidation stage. Alternately, the exit gas from the first oxidation stage can be fed into a single vessel heat exchanger utilized for the combined pre-heating of the gases to be fed into the first and third oxidation stages.

The improved process of this invention is particularly advantageous for use in a multiple catalytic process having three oxidation stages with an intermediate absorption stage between the second and third oxidation stages. In such system, the exit gas from the first oxidation stage is split into two streams and employed as described above. Further pre-heating of the gas to be fed into the first oxidation stage is obtained by heat exchange with exit gas from the second oxidation stage. The two streams split from the exit gas of the first oxidation stage, after heat exchange, are then fed into the second oxidation stage, which preferably has two or more catalyst beds, with intermediate cooling between beds. The exist gas from the second oxidation stage, after exchanging heat with the gas fed to the first oxidation stage, is then fed into the intermediate absorption apparatus. The cooled gas emerging from the first absorption apparatus is first pre-heated in a heat exchanger using exhaust gas from the final oxidation stage and then pre-heated to the desired initiation temperature in a heat exchanger utilizing a portion of the stream of the exit gas emanating from the first oxidation stage, as noted. The exit gas from the final oxidation stage is then cooled in the above-mentioned heat exchanger and fed to a final absorption stage.

Sulfur dioxide-containing gas can be produced by a variety of reactions, such as by the oxidation of hydrogen sulfide or hydrocarbon mercaptans, or by metallurgical smelting and the like. Roasting gas and other sulfur dioxide-containing gas having a sulfur dioxide content of less than about 9%, and an oxygen-to-sulfur dioxide ratio of about 1.0, can be most efficiently treated in accordance with the improved process of this invention. High content sulfur dioxide gas can be purified, diluted, dried, and pre-heated prior to being fed into the conversion system. High strength purified sulfur dioxide gas is usually diluted with air to provide the required oxygen-to-sulfur dioxide ratio. The sulfur dioxide-containing gas is preferably fed into the conversion system, prior to the pre-heating operations, at a temperature of about 150° F.

It is a significant advantage of this process that optimum additional catalysis can be carried out in the oxidation stage immediately preceding the intermediate absorption stage. Such excellent results can be obtained with only minor modification of conventional multiple catalysts systems and at minimum original and operation cost. As a result, sulfuric acid, oleum, liquid sulfur trioxide and the like can be manufactured under significantly improved economic conditions. Conversion efficiencies in excess of 99.8 percent are possible.

The improved process of this invention is unique in that it provides a surprisingly simple and yet highly economical means for maintaining each of the gaseous streams, introduced into successive oxidation stages, at its required initiation temperature without excessive heat transfer area, and being thermally independent of the exit temperatures of a previous catalyst bed. In the process disclosed in U.S. Pat. 3,259,459, discussed above, it is evident that the temperature of gas exiting from the second oxidation stage must be higher than the temperature of gas introduced into the third oxidation stage, if any heat exchange is to occur. Thus, the temperature of exit gas from the second oxidation stage must be at a higher temperature than the initiation temperature of gas passed into the final oxidation stage. In the improved process of this invention, however, the exit gas from the second oxidation stage can be at a higher temperature, an equal temperature, or a lower temperature than the gas fed into the final oxidation stage. This allows optimum conversion and complete flexibility, which cannot otherwise be achieved.

BRIEF DESCRIPTION OF THE DRAWING

The drawing is a diagramatic view of the improved multiple stage oxidation and absorption process of this invention.

DESCRIPTION OF THE PREFERRED EMBODIMENTS

Referring to the drawing, sulfur dioxide-containing gas, which is previously purified, diluted, and dried to form in-feed gas having an oxygen-to-sulfur dioxide ratio of approximately 1.0, and a sulfur dioxide content of less than about 9 percent, is introduced into the conversion system at a temperature of from about 120° F. to 180° F., with 150° F. being an especially preferred in-feed temperature. The sulfur dioxide-containing gas is pre-heated to a temperature within a range of from about 790° F. to 840° F. in heat exchangers 1 and 2 using the exothermic reaction heat from oxidation stage 4 and a portion of gas from stage 3. The gas is preferably fed into stage 3 at a temperature of about 820° F. Only a portion of the exit gas from the first oxidation stage 3 is used in pre-heating the in-feed gas in heat exchanger 2. That is, the gas issuing from the first catalyst stage 3, which can be at a temperature of approximately 1130° F., is split into two streams, only one of which is employed in heat exchanger 2. The second gas stream is passed through a heat exchanger 5, utilized for pre-heating gas to be fed into the final oxidation stage 9. The two gas streams from 2 and 5 are then combined and fed into multipass catalyst bed oxidation stage 4 for further conversion of sulfur dioxide to sulfur trioxide. Intermediate cooling of gas in the multiple catalyst bed oxidation stage 4 can be accomplished using a heat exchanger, economizer, or boiler 12, provided between two or more of the oxidation stages. Also, cooling could be provided at this point by dilution with cold dried gas or air.

An intermediate absorption stage 6 is provided between oxidation stages 4 and 9. Exit gas from converter 4, typically at a temperature of about 850° F., is cooled in heat exchanger 1, where it gives up exothermic reaction heat to pre-heat incoming feed gas, and is then passed to absorption apparatus 6. Acid entrained in the gas leaving the absorption apparatus 6 is removed by a suitable media 7 and the clarified gas is pre-heated before being fed to the final oxidation stage 9. The pre-heating of the gas from absorption stage 6 can be accomplished using two heat exchangers: the first being heat exchanger 8 using the heat content of exit gases from the final oxidation stage 9, and the second being heat exchanger 5 using a portion of the heat content of gas exiting from the first oxidation stage 3. In such manner, gas leaving the intermediate absorption stage 6, which is typically at a temperature of about 185° F., can be easily pre-heated with minimum heat transfer surface to the final initiation temperature required.

As an extremely important advantage of the process of this invention, the temperature of gas leaving the penultimate oxidation stage 4 need not be greater than the initiation temperature required in the final oxidation stage 9. Gas leaving oxidation stage 4 can be at a higher temperature, an equal temperature, or a lower temperature in relation to the final initiation temperature, going to 9. The initiation temperature required for each of the oxidation stages can therefore be easily obtained with only minor alteration of existing processing apparatus. The significantly improved flexibility of available temperature afforded by means of the process of this invention thus makes possible extremely high conversion efficiencies.

It is noted that exit gas from the first oxidation stage 3 need not be split into two streams for effecting the unique heat exchange operation of this invention. For example, heat exchangers 2 and 5 can be incorporated into a single heat exchanger, with exit gas from oxidation stage 3 flowing into and out of the heating exchanger in a single stream. It is only required that a portion of the exothermic reaction heat from the first oxidation stage 3 be utilized in pre-heating gas introduced into oxidation stage 9, following the intermediate absorption stage 6.

After final catalysis in oxidation stage 9, the converter gas is passed through heat exchanger 8 and to a second absorption tower 10 for final absorption. Gas exiting from such final absorption stage is demisted in a conventional demisting media 11, to reduce any entrained acid mist, and vented to the atmosphere.

Conventional oxidation apparatus, such as that employing vanadium pentoxide catalyst beds, can be used in accordance with the improved process of this invention. Similarly, presently available absorption and heat exchange equipment, as well as any other necessary units, can be utilized.

It is claimed:
1. In a process for the production of sulfur trioxide wherein sulfur dioxide-containing gas is subjected to catalytic oxidation in at least three successive oxidation stages, with an intermediate absorption stage between two successive oxidation stages, the improvement comprising utilizing a portion of the exothermic reaction heat of gas exiting from a first oxidation stage, other than one of the two successive oxidation stages between which the intermediate absorption stage is carried out, for pre-heating gas passed from the intermediate absorption stage into the following oxidation stage, whereby a conversion efficiency in excess of 99.8 percent is possible.

2. The process of claim 1 wherein the gas passed from the intermediate absorption stage to the following oxidation stage is pre-heated in a heat exchanger utilizing a separate stream of the exit gas from the first oxidation stage.

3. The process of claim 1 wherein three oxidation stages are employed and wherein exit gas from the first oxidation stage is split into two streams, one stream being used for pre-heating gas fed to the first oxidation stage and the other stream being used for pre-heating gas passed from the intermediate absorption stage, into the final oxidation stage.

4. The process of claim 1 wherein three oxidation stages are employed and wherein the exit gas from the first oxidation stage is passed into a single heat exchanger utilized for pre-heating two separate gas streams passing respectively into the first and third oxidation stages, an intermediate absorption stage being provided between the second and third oxidation stages.

5. The process of claim 1 wherein the sulfur dioxide-containing gas is introduced into the conversion system at a temperature of from about 120° F. to 180° F. and wherein such gas is pre-heated before introduction into the first oxidation stage by means of exit gas from the first and third oxidation stages.

6. The process of claim 1 wherein the oxygen-to-sulfur dioxide ratio of the sulfur dioxide-containing gas is approximately 1.0.

7. The process of claim 1 wherein the sulfur dioxide content of the sulfur dioxide-containing gas is less than about 9 percent.

8. The process of claim 1 wherein gas exiting the oxidation stage preceding the intermediate absorption stage is at a lower temperature than the temperature of the gas entering the following oxidation stage.

9. The present of claim 1 wherein the gas exiting the oxidation stage preceding the intermediate absorption stage is at a temperature equal to the temperature of the gas entering the following oxidation stage.

10. The process of claim 1 wherein gas exiting the oxidation stage preceding the intermediate absorption stage is at a temperature higher than the temperature of the gas entering the following oxidation stage.

11. The process of claim 1 wherein approximately one-half of the exothermic reaction heat of gas exiting from the first oxidation stage is utilized for pre-heating gas introduced into the oxidation stage following the intermediate absorption stage.

12. In a process for the production of sulfur trioxide by the catalytic conversion of sulfur dioxide-containing gas in at least three successive oxidation stages, with an intermediate absorption stage between two successive oxidation stages, the improvement comprising:
  (a) introducing pre-heated sulfur dioxide-containing gas into the first of the three successive oxidation stages, having an intermediate absorption stage between the second and third stages;
  (b) utilizing a portion of the excthermic reaction heat of gas leaving the first oxidation stage for pre-heating gas passing from the intermediate absorption stage into the third oxidation stage;
  (c) utilizing the remaining portion of the exothermic reaction heat of gas leaving the first oxidation stage for effecting the pre-heating of gas introduced into the first oxidation stage;
  (d) passing the cooled gas from steps (b) and (c) into the second oxidation stage for further conversion;
  (e) utilizing the exit gas from the second oxidation stage for effecting further pre-heating of gas introduced into the first oxidation stage;
  (f) passing the cooled gas from step (e) through the intermediate absorption stage;
  (g) passing the gas from the intermediate absorption stage, after having been pre-heated in accordance with step (b) into the third oxidation stage;
  (h) utilizing the exit gas from the third oxidation stage for pre-heating gas introduced into the third oxidation stage; and
  (i) passing the cooled exhaust gas from step (h) to a final absorption stage.

References Cited

UNITED STATES PATENTS

| | | | |
|---|---|---|---|
| 3,362,786 | 1/1968 | Burkhardt | 23—175 |
| 3,259,459 | 7/1966 | Moller | 23—176 |

FOREIGN PATENTS 1,058,261 2/1967 England.

OSCAR R. VERTIZ, Primary Examiner

C. B. RODMAN, Assistant Examiner

U.S. Cl. X.R.

23—176